(12) United States Patent
Goettinger et al.

(10) Patent No.: US 9,004,405 B2
(45) Date of Patent: Apr. 14, 2015

(54) LOAD INTRODUCING ELEMENT

(75) Inventors: Marco Goettinger, Munich (DE);
Tamas Havar, Bruckmuehl (DE);
Xavier Hue, Bremen (DE); Franz Stadler, Boehmfeld (DE)

(73) Assignees: EADS Deutschland GmbH, Ottobrunn (DE); AIRBUS Operations GmbH, Hamburg (DE)

( * ) Notice: Subject to any disclaimer, the term of this patent is extended or adjusted under 35 U.S.C. 154(b) by 1586 days.

(21) Appl. No.: 12/560,980

(22) Filed: Sep. 16, 2009

(65) Prior Publication Data

US 2010/0065689 A1  Mar. 18, 2010

(30) Foreign Application Priority Data

Sep. 17, 2008 (DE) .................... 10 2008 047 793

(51) Int. Cl.
*B64C 9/02* (2006.01)
*B64C 9/00* (2006.01)
*B64C 3/18* (2006.01)

(52) U.S. Cl.
CPC . *B64C 3/187* (2013.01); *B64C 9/02* (2013.01); *Y02T 50/44* (2013.01)

(58) Field of Classification Search
CPC .............. B64C 9/00; B64C 9/02; B64C 9/08; B64C 9/14; B64C 9/16; B64C 9/18; B64C 3/18; B64C 3/182; B64C 3/185; B64C 3/187; B64C 3/38; B64C 3/44; B64C 3/50; B64C 5/08
USPC ........ 244/131, 211–217, 123.1, 123.7, 123.8, 244/124, 117 R
See application file for complete search history.

(56) References Cited

U.S. PATENT DOCUMENTS 5,806,798 A    9/1998   Gillandt et al.
5,836,550 A *  11/1998  Paez ............................ 244/214
(Continued)

FOREIGN PATENT DOCUMENTS

AT    410 656 B    6/2003
CN    101160235 A   4/2008
(Continued)

OTHER PUBLICATIONS

German Office Action dated Mar. 7, 2014 (nine (9) pages).
(Continued)

*Primary Examiner* — Tien Dinh
*Assistant Examiner* — Richard R Green
(74) *Attorney, Agent, or Firm* — Crowell & Moring LLP

(57) ABSTRACT

A load introducing element for a control surface of an aircraft or a spacecraft comprises at least one first component, one second component and one first flange. At least one surface area of the first component is adapted to conform to the inner contour of the control surface. The second component has at least one eye for receiving bearing means for mounting the control surface. A cross sectional profile of the first component has two or more essentially straight legs, which are connected together on their upper side by an upper edge which is adapted to an upper contour of the control surface. The load introducing element is formed by a fiber reinforced composite material having an integral type of construction in which all of the components are jointly infiltrated and cured. The invention also provides a method for producing such a load introducing element, a drive armature and an aircraft that includes such a load bearing element.

19 Claims, 7 Drawing Sheets

(56) References Cited

U.S. PATENT DOCUMENTS

| | | | |
|---|---|---|---|
| 5,924,649 A | 7/1999 | Piening et al. | |
| 6,735,842 B1* | 5/2004 | Wildenrotter et al. | 29/525.01 |
| 6,935,118 B2* | 8/2005 | Gould et al. | 60/771 |
| 7,753,313 B1* | 7/2010 | Barr et al. | 244/123.1 |
| 2002/0100840 A1* | 8/2002 | Billinger et al. | 244/131 |
| 2008/0023585 A1 | 1/2008 | Kordel et al. | |
| 2008/0169383 A1 | 7/2008 | Patzelt et al. | |

FOREIGN PATENT DOCUMENTS

| | | |
|---|---|---|
| DE | 103 39 030 B4 | 11/2005 |
| WO | WO 2007/091990 A2 | 8/2007 |

OTHER PUBLICATIONS

Chinese Office Action dated Mar. 25, 2013 with Partial English Translation (eight (8) pages).
Chinese Office Action dated Nov. 15, 2013 with Partial English Translation (eleven (11) pages).
Chinese Office Action dated May 20, 2014 with Partial English Translation (six (6) pages).
German Office Action dated Mar. 13, 2012 (nine (9) pages).
Chinese Search Report dated Nov. 7, 2013 partially translated (two (2) pages).

* cited by examiner

LOAD INTRODUCING ELEMENT

BACKGROUND AND SUMMARY OF THE INVENTION

This application claims the priority of German patent document 10 2008 047 793.1, filed Sep. 17, 2008, the disclosure of which is expressly incorporated by reference herein.

The present invention relates to a load introducing element for a control surface of an aircraft or a spacecraft, as well as to a method for manufacturing the same, and to an aircraft including the same.

Larger control surfaces of commercial passenger airplanes often include ribs, which are mounted on at least one spar and are enveloped by an outer skin. Control surfaces with a relatively complex movement pattern (which, for example, goes well beyond a simple flapping) require a special mounting and special drive elements. Thus, for example, in order to increase the lift coefficient in certain flight phases Fowler flaps move in both a translatory and rotational manner and, correspondingly, are mounted in a moveable manner (for example, on pendulum supports, roller carriages or the like) and deflected by a pivotably mounted actuator.

Therefore, a control surface design which is adapted to the above features includes at least one rib that serves as the interface between loads that occur on the control surface and the structure of the craft. Furthermore, this rib can be used to mount the control surface. Currently such "load introducing ribs" are manufactured as a metal part to be milled—even in the case of a total CRP [carbon fiber reinforced plastic] construction of the control surface itself—and are mechanically connected to the control surface (for example, by interlocking connecting elements).

The production of such a metal load introducing rib is very expensive because it involves mechanical machining of a solid workpiece and, thus, results in high costs. Furthermore, there is the drawback that in the case of control surfaces that are made of fiber reinforced composite materials, a metal load introducing rib has a different heat expansion behavior than the control surface, attached to it. The result may be mechanical stresses that can be compensated only by means of suitably designed structures or by flexible mountings. Consequently such metal load introducing ribs are extremely disadvantageous in modern commercial passenger airplanes with control surfaces that are made of fiber reinforced composite materials.

One object of the present invention is to provide a load introducing element that does not suffer from the above described drawbacks; but rather is as simple as possible to produce, weighs as little as possible, and has a heat expansion behavior that is similar to that, for example, of a control surface that is made of a fiber reinforced composite material.

This object of the invention is achieved by the load introducing element according to the invention, as well as a method for manufacturing such a load introducing element, and an aircraft with at least one control surface and at least one such load introducing element.

According to one aspect of the invention, the inventive load introducing element has a first component and a second component which fulfill two different functions. When viewed from the shape of its upper surface, the first component acts as a conventional rib, making it possible to achieve a covering by way of the inventive load introducing element with a continuous contour. The second component has at least one eye for receiving bearing means for mounting the control surface, so that the mechanical load introduction is achieved in essence by means of the second component, which transfers the load into the first component that is connected to said second component.

An additional very important aspect of the invention lies in the fact that the individual components of the inventive load introducing element (for example, the first component and the second component) are not produced separately from each other and are not subsequently adapted to each other and connected together in an expensive manner. Rather the individual components, composed of one layer or multiple layers of fibrous preforms, are laid and then are jointly infiltrated and cured, for example, in an appropriate mold. In this way it is possible to produce the individual components in the form of fibrous substructures comprising multiple layers of a fibrous perform, and then to assemble these fibrous substructures in the mold, in order to infiltrate and cure jointly the whole assembly of fibrous substructures.

According to this method, the load introducing element of the invention exhibits very uniform material properties, and due to the joint infiltration and curing, the individual components are also connected together in an optional way to form an integral module made of fiber reinforced composite material. Similarly the individual components can be optimized with respect to the ensuing force directions, for example, by means of suitably oriented fibers. Such an optimization could not be achieved if the components were made of metal, because such an ultra lightweight member, which is optimized for force directions, cannot be produced by machining or deformation. With mechanical processing tools the cost would clearly be too high, and the resulting component would be too cost intensive.

Furthermore, the weight can be significantly reduced by manufacturing from a fiber reinforced composite material, comprising individual fibrous preforms and a matrix material, so that a control surface that is equipped with a load introducing element according to the invention, can be significantly lighter than a conventional control surface with a metal load introducing rib.

Another important aspect of the invention is that the heat expansion behavior of a whole control surface with a load introducing element of the invention is homogeneous, so that no structural or mechanical adjustments are required to accommodate different heat expansion behaviors between the control surface and the metal load introducing rib.

In a preferred embodiment of the load introducing element of the invention, the first component has a surface area that is adapted to the inner contour of the contour surface, so that a covering can be carried out, as in the case of all reinforcement ribs of the control surface. A cross sectional profile of this first component of the preferred embodiment has two or more essentially straight legs which are connected together on their upper side by means of an upper edge that is adapted to an upper contour of the control surface. Furthermore, at least one first flange for connecting to at least one structure of the control surface is arranged on the end of the first component that faces away from the upper edge. In this way the first component can exhibit a cross sectional profile that is shaped in essence like an omega, and has sufficient design space for housing a second component. Furthermore, this profile exhibits an especially advantageous moment of surface inertia for absorbing mechanical flexural or torsional loads.

In a preferred embodiment of the load introducing element of the invention, the first flange and the first component are constructed from common layers of material in the form of fibrous structures, fiber braids, composite fiber mats or other similarly constructed layers of a fibrous material. As a result, it is possible to minimize the risk of mechanical damage (resulting, for example, from fastening the flange to the first component) between the first flange and the first component.

Furthermore, the production of such a component is simplified and is, consequently, more cost effective. Finally even the introduction of force can be designed so as to be very uniform and continuous between the flange and the first component, so that it is possible to make the wall thickness correspondingly thin.

In an especially preferred load introducing element of the invention, the second component is enveloped (at least in certain areas) by the first component. In this way it is also possible to achieve an especially uniform and continuous transmission of force between at least one eye of the second component into the first component of the load introducing element of the invention. In addition, the free space that is available in the first component is occupied by the second component and, thus, additionally reinforces the first component.

It is especially preferred that the second component exhibits a greater wall thickness in an area that includes the at least the one eye, than in an area that is enveloped by the first component. In the area that includes the at least the one eye, bushings, bolts or the like are usually used by way of a borehole and/or opening, for the purpose of transferring forces and movements of bearing means to the second component, so that the mechanical stress of this area is especially significant. In order to prevent the structure of the second component from suffering any damage, the wall thickness in this area must be dimensioned correspondingly. The resulting stresses are distributed outside this area into the second component, which needs a thinner wall thickness to cope with the loads.

It is especially preferred that the second component exhibits a profile cross section that is essentially U shaped. Such a construction allows the second component to be housed very easily in a first component, which has the shape, for example, of an omega, and, moreover, exhibits adequate design space to house other components. This structure makes possible an especially optimal moment of surface inertia because the leg of the U profile is positioned at a distance.

Similarly it is preferred that the load introducing element of the invention exhibits at least one material layer, the cross section of which is L shaped. Furthermore, said material layer is applied simultaneously, at least in certain areas, on at least one element of the group, composed of the first component, the second component and the first flange. For example, this could be a part of the eye and is applied from the outside on the second component. In this case the angle is below the flange of the first component. On the other hand, the first flange could be further reinforced in relation to the first component, a state that could be achieved by laying an L shaped layer of material on the first flange when affixing to a wall surface of the first component.

Furthermore, it is especially preferred that the load introducing element of the invention has at least one wall plate that is integrated into the at least one second component. Such wall plates could be used to distribute loads in the spanwise direction over both halves of the second component and eventually to connect again in a load bearing manner the load bearing structures of the control surface, which are separated by the load introducing element of the invention. This could be, for example, a front spar or the like. Working on this basis, there are preferred positions for such wall plates, for example, in the area of the eyes.

In addition, it is also preferred that the load introducing element of the invention has at least one second flange that is aligned substantially transversely to the direction of stretch of the load introducing element. Such a second flange makes it possible to attach the load introducing element of the invention to additional load bearing structures of the control surface—for example, a rear spar and/or an auxiliary spar—that is positioned in the spanwise direction.

In addition, it is preferred that the first component includes a provision for connecting to a drive armature. The drive armature allows the load introducing element of the invention to be deflected in a separate component, so that the receiving points for the actuators can be designed in an optimal way, without having to compromise the integrity of the load introducing element and the points for receiving the bearing means. Since the load introducing element of the invention does not have unlimited design space inside the control surface, this approach offers itself, because the drive armature could be positioned, for example, laterally to the load introducing element of the invention.

Finally it is advantageous if the load introducing element of the invention is an integral component.

The invention also includes a method for producing such a load introducing element, comprising cutting to size preformed fibrous substructures out of a fibrous material, draping these fibrous substructures in order to mold the first component, the second component and the first flange in the form of a single semi-finished product, inserting the semi-finished product into a mold, initiating the matrix material and then curing. This procedure achieves an integral component in the form of the inventive load introducing element that is limited to a few process steps and, hence, can be carried out at a low cost. In order to ensure the dimensional stability of the load introducing element of the invention, conventional mechanical machining devices can also be used additionally for subsequent finishing work, the cost of which, however, is unrelated to the cost of machining a solid part to be milled.

Finally the invention also includes an aircraft or spacecraft which has at least one control surface with at least one load introducing element according to the invention.

Other objects, advantages and novel features of the present invention will become apparent from the following detailed description of the invention when considered in conjunction with the accompanying drawings.

BRIEF DESCRIPTION OF THE INVENTION

DETAILED DESCRIPTION OF THE INVENTION

Figure 1:
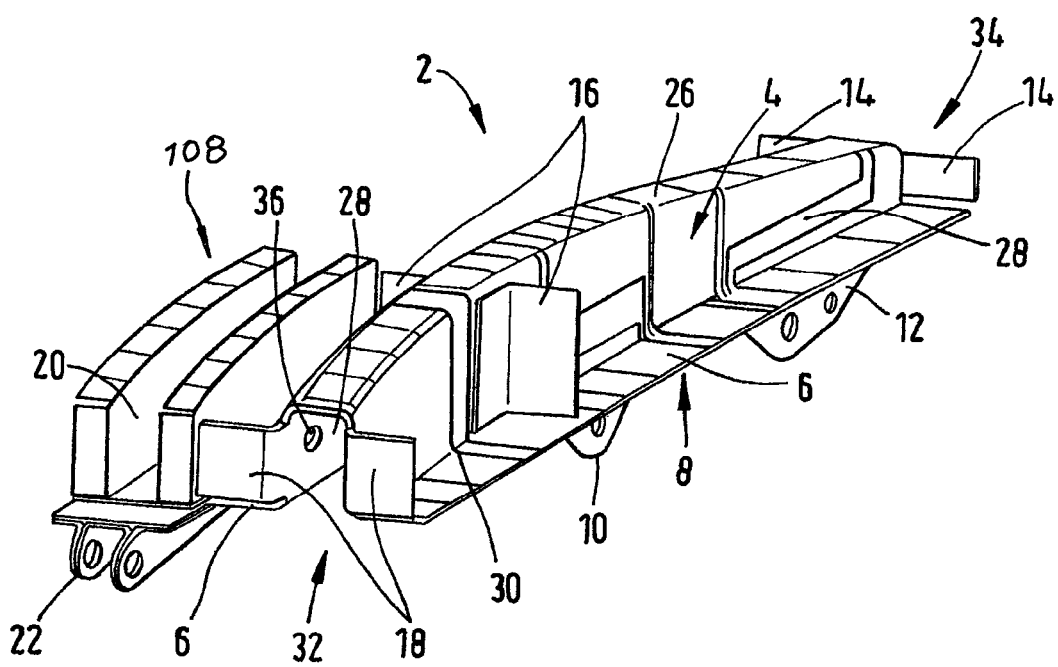
FIG. 1 is a three dimensional view of an inventive load introducing element and a drive armature.

FIG. 1 depicts an embodiment of a load introducing element 2 according to the invention, which includes a first component 4, two first flanges 6, a second component 8 (also depicted in FIGS. 2a and 2b) with eyes 10 and 12 and six second flanges 14, 16, 18, and a drive armature 108 with a drive armature rib 20 and a drive armature yoke 22. The first component 4 of the load introducing element 2 of the invention has an upper surface 26 that is adapted in such a manner that it lies as flush as possible with the inner contour of a control surface, depicted in this drawing. It is evident that the upper surface 26 of the first component 4 is arched in a manner analogous to an airfoil of an aircraft. Laterally from the upper surface 26 there are two walls 28, which run substantially parallel to each other and perpendicular to the first flanges 6. If the first component 4 were to be cut vertically, the two walls 28 would form two legs, which are connected to each other by an upper edge that is adapted to the upper contour of the control surface. In this context the upper edge is formed by the cut of the upper surface 26. In the illustrated example the first component 4 forms, together with the two first flanges 6, a rigid unit made of common layers of material. This means that on draping the fibrous performs, a bend 30 is provided, at which the walls 28 are converted into one flange 6 in each case. The result is an essentially omega shaped profile contour of the inventive load introducing element 2 in its first component 4 with the first flanges 6.

The first component 4 has a front end 32 and a rear end 34, at which the respective two second flanges 14 and 18 are arranged. The second flanges 14 and 18 serve to connect the inventive load introducing element 2 to the structural components, for example, spars or the like, of the control surface, which is attached to the load introducing element 2. The connection to the structural components can be achieved by adhesive cementing, laminating on, rivets, screws or any other known techniques.

Below the first component 4, and/or enveloped by the same, there is at least one second component 8, on which are mounted, for example, eyes 10 and 12. (See FIGS. 2a and 2b.) The eyes 10 and 12 serve to mount, in a moveable manner, the inventive load introducing element 2 on the aircraft or spacecraft, so that the load introducing element 2 of the invention can traverse a motion path that is defined by the respective bearing means. A so-called "swing link" is mounted, for example, at the eye 10, and two openings 36, on the front side 32 of the load introducing element 2.

In order to perform a desired movement, it is necessary to drive the load introducing element 2 of the invention. For this reason, a drive armature 108 is arranged on the inventive load introducing element, which can be connected to an actuator by means of the drive armature yoke 22. For example, the drive armature 108 could be connected by means of the second flanges 16 and 18 as well as the first flange 6 on the left side of the load introducing element 2 of the invention.

Figure 2A:
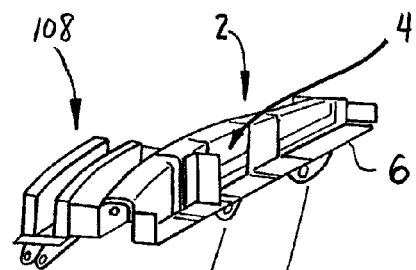
FIGS. 2a and 2b show is a three dimensional views of two second components.
Figure 2B:
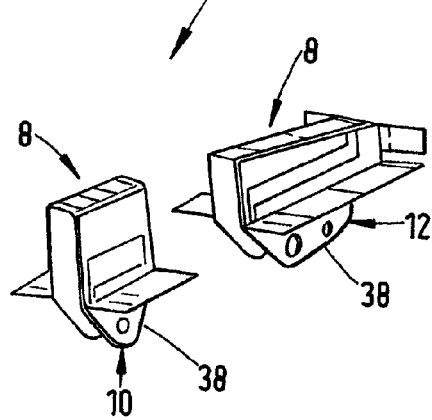
Figure 2C:
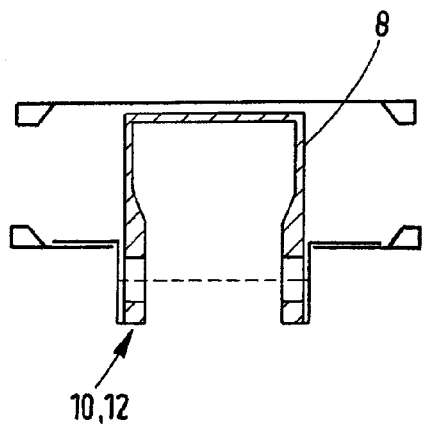
FIG. 2c is a sectional view of a second component in the installed state.

As FIG. 2a shows, the omega shaped first component 4 with the first flanges 6 can have one or more second components 8. In this case the second components 8 have a basic U shape, which is open in the downwards direction, as shown in FIGS. 2b and 2c. This basic shape has, for example, L shaped material layers 38, which are configured in such a way that they reinforce the eyes 10 and 12 of the first components 8. Moreover, the bottom side of said material layers can lie flush with the first flanges 6. In this way very high strength can be achieved, especially if all of the components of the inventive load introducing element 2, including the L shaped layers 38 of material, are produced in an integral type of construction with a joint infiltration process and a subsequent joint curing process. Furthermore, as FIG. 2c shows, the second components 8 can exhibit different wall thicknesses in several areas. Thus, for example, the areas which surround the eye 10 or 12, can be provided with a relatively large wall thickness, whereas the areas of the second components 8 that are surrounded by the first component 4, can be provided with a relatively thin wall thickness.

Figure 3:
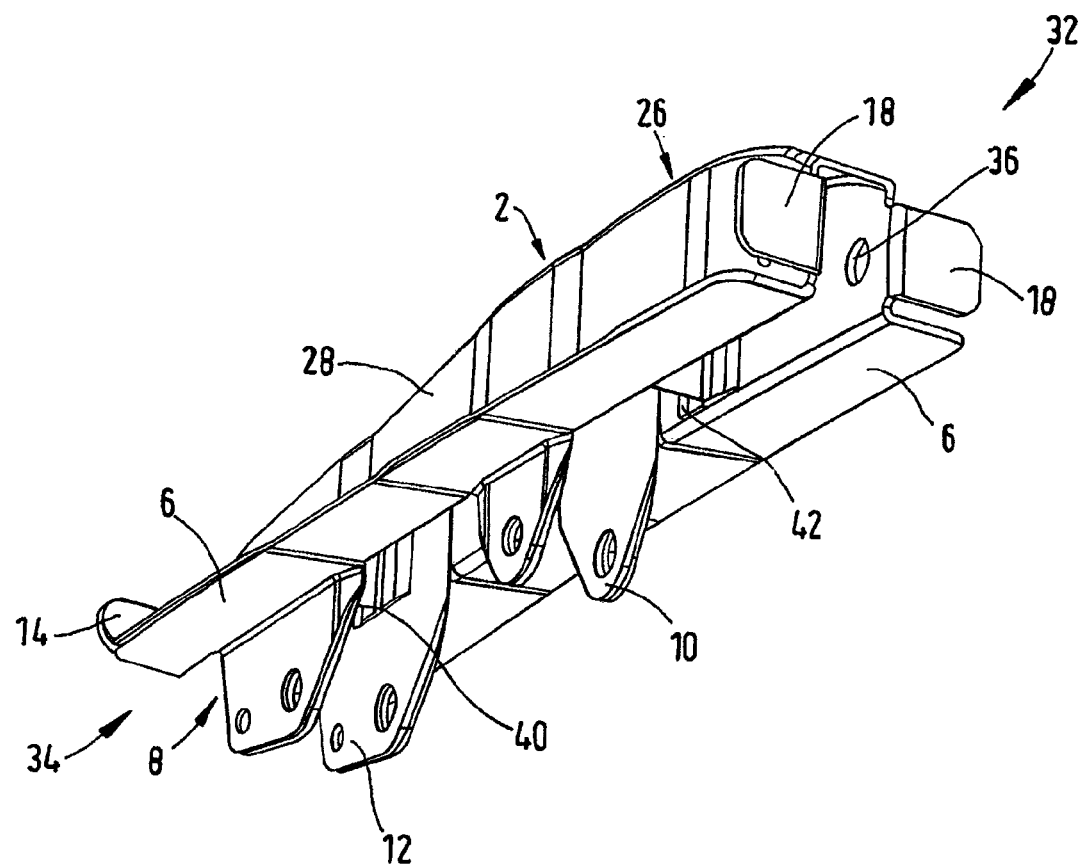
FIG. 3 is a three dimensional view of a load introducing element, according to the invention.

FIG. 3 shows how the strength of the load introducing element 2 of the invention can be increased even more. If, for example, the load introducing element 2 interrupts one or more structural components of the control surface, such as a spar, then the load and/or introduction of force in this area can be bridged by a respective wall plate 40 and 42. A first wall plate 40 could be positioned inside a second component 8, mounted on the rear end 34, whereas a second wall plate 42 could be mounted more in the direction of the front side 32 of the load introducing element 2 of the invention. In the spanwise direction, which runs substantially transversely to the stretch of the load introducing element 2, the introduction of force would no longer be interrupted.

Figure 4A:
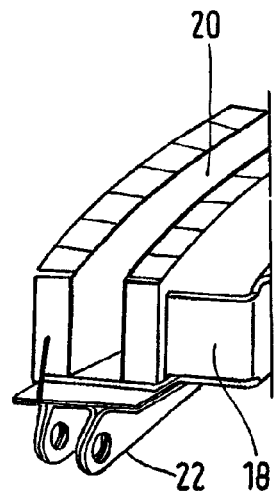
FIG. 4a is a three dimensional view of a drive armature.
Figure 4D:
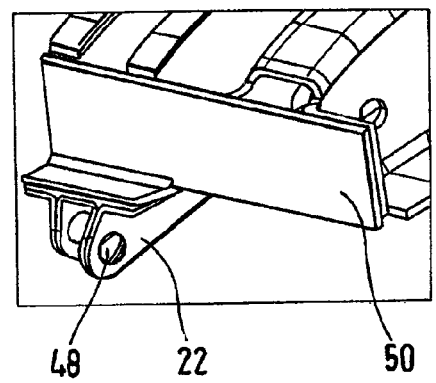
FIG. 4d is a three dimensional view of an inventive load introducing element and a drive armature with an additional spar.
Figure 4B:
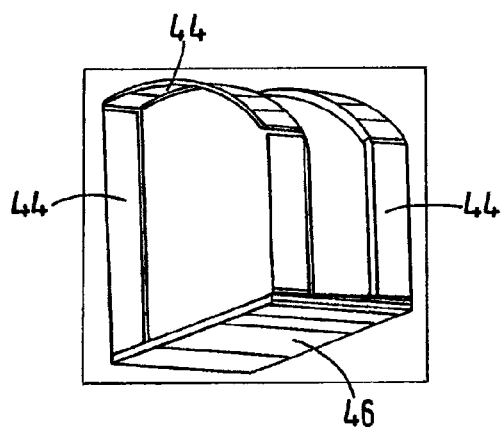
FIG. 4b is a three dimensional view of a drive armature rib.
Figure 4C:
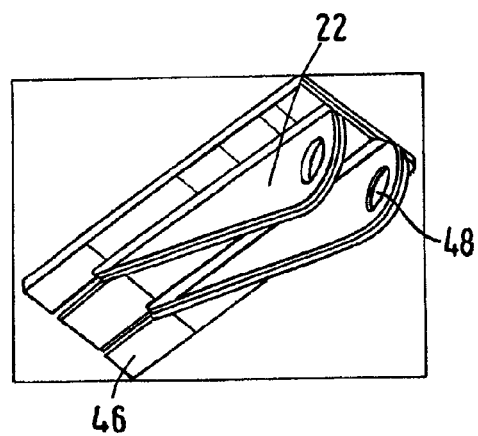
FIG. 4c is a three dimensional view of a drive armature yoke.

FIG. 4a shows once again a drive armature 108, which consists in essence of two main components, that is, a drive armature rib 20 and a drive armature yoke 22 (FIGS. 4b and 4c). The drive armature rib 20 exhibits, in the direction of its side faces, a fold 44, which serves as the flange or the reinforcement, and which could be connected, for example, to the corresponding second flanges 16 and 18. On a base plate 46 there is in the opposite direction to the drive armature rib 20 the drive armature yoke 22, which has a substantially U shaped profile with variable height, in which there are two boreholes 48 for receiving and supporting a driven end of an actuator that is not illustrated. The force of the actuator, acting in the openings 48, is transmitted via the base plate 46 into the drive armature rib 20 and from there via the corresponding second flanges 16, 18 and eventually 6, into the inventive load introducing element 2, where it acts in the surrounding control surface. In order to improve the force transfer, FIG. 4d shows an additional spar 50, which is mounted on the second flanges 18 and the drive armature rib 20 with its folds 44.

Figure 5:
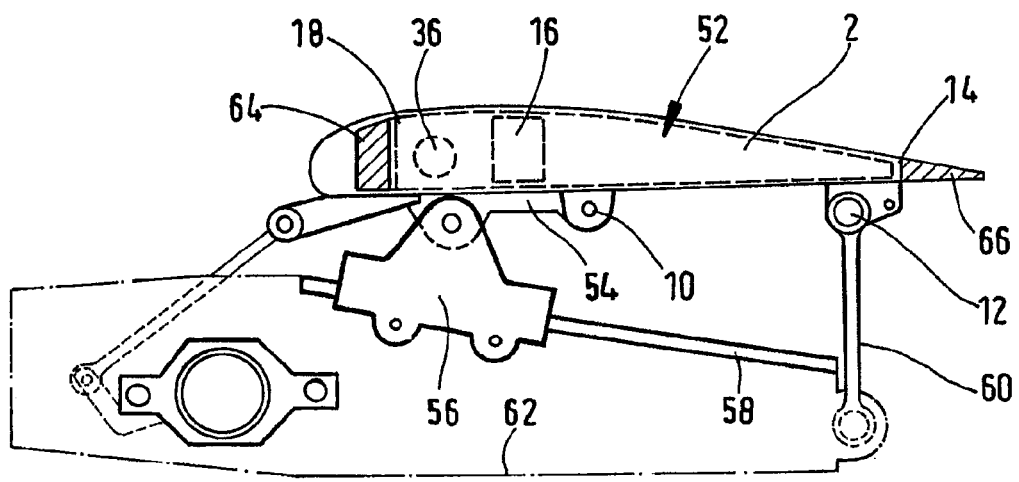
FIG. 5 is a schematic view of a mounted control surface with a load introducing element, according to the invention.

Furthermore, FIG. 5 shows in schematic form, a control surface 52, which is provided with a load introducing element 2 of the invention and a related drive armature 108, which is covered in the chosen drawing. Between the openings 36 and the eye 10 there is a "swing link" 54, which is mounted, for example, on a carriage 56, which is guided on a rail 58. In the rear eye 12 of the load introducing element 2 there is an end of a connecting member 60 ("rear link"), which is mounted via its end opposite the load introducing element 2, on a body 62, supporting the rail 58. In the graphical rendering of this one example, the front second flanges 18 could be attached to a type of front spar 64 or a comparable area of a control surface 52, which is made of fiber reinforced composite materials, the rear second flanges 14 could be attached to a type of rear spar 66, and the central second flanges 16 could be attached to an additional structural component (not illustrated) of the control surface 52, so that the load introducing element 2 of the invention is rigidly integrated into the structure of the control surface 52.

Figure 6:
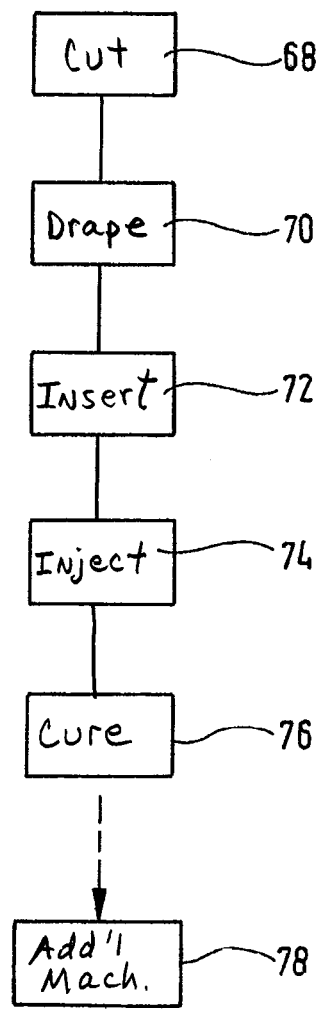
FIG. 6 is a schematic view of the method according to the invention.

FIG. 6 is a flow diagram that shows the method for producing a load introducing element 2, according to the invention, which includes the following steps: cutting to size 68 the preformed fibrous substructures composed of fibrous material, draping 70 the fibrous substructures to mold the first component, the second component and the first flange in the form of a single semi-finished product, inserting 72 the semi-finished product into a mold, injecting 74 the matrix material and then curing 76. The execution 78 of additional subsequent machining is necessary as a function of the quality of the production process up to that point.

Figure 7:
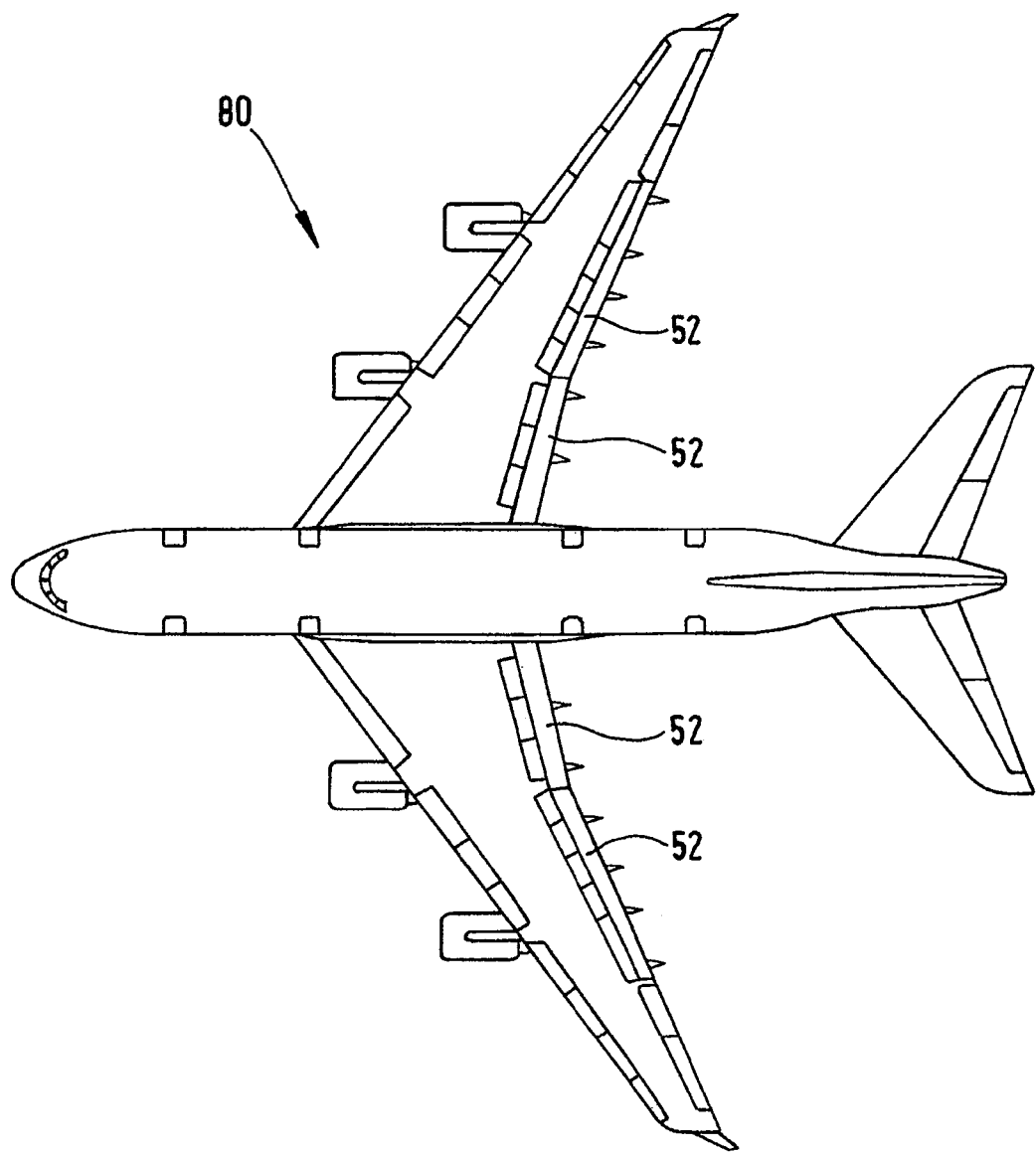
FIG. 7 depicts an aircraft with a control surface and a load introducing element according to the invention.

Finally FIG. 7 shows an aircraft 80, which includes a plurality of control surfaces 52, in each of which there are one or more load introducing elements 2 of the invention as well as the corresponding drive armatures 108.

For the sake of completeness it is noted that "comprising" does not exclude any other elements or steps, and "one" does not exclude a plurality. Moreover, features or steps, which have been described with reference to one of the above embodiments, can also be used in combination with other features or steps of other embodiments that are described above. Reference numerals in the claims are not to be regarded as a restriction.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

REFERENCE NUMERALS 2 load introducing element
4 first component
6 first flange
8 second component
10 eye
12 eye
14 second flange
16 second flange
18 third flange
20 drive armature rib
22 drive armature yoke
26 upper surface
28 wall
30 bend
32 front end of the first component
34 rear end of the first component
36 opening
38 L shaped layer of material
40 wall plate
42 wall plate
44 fold
46 base plate
48 borehole
50 spar
54 swing link
56 carriage
58 rail
60 connecting member
62 body
64 front spar
66 rear spar
68 cutting to size
70 draping
72 inserting the semi-finished product into the mold
74 injecting the matrix material
76 curing
78 executing the subsequent machining
80 aircraft
108 drive armature

What is claimed is:

1. A load introducing element for a control surface of an aircraft or a spacecraft, said load element comprising:
   at least one first component;
   at least one second component; and
   at least one first flange for connecting to at least one rib of the control surface; wherein,
   at least one surface area of the first component is adapted to an inner contour of the control surface;
   the second component exhibits at least one eye for mounting the control surface; and
   a cross sectional profile of the first component has at least two substantially straight legs, which are connected together on their upper side by means of an upper edge, that is adapted to the contour of the control surface.

2. The load introducing element, as claimed in claim 1, wherein the first flange is arranged on at least one leg on an end of the first component that faces away from the upper edge.

3. The load introducing element, as claimed in claim 1, wherein the first flange and the first component are formed by common layers of material.

4. The load introducing element, as claimed in claim 1, wherein the second component is enveloped at least in certain areas by the first component.

5. The load introducing element, as claimed in claim 1, wherein the second component has a greater wall thickness in an area comprising at least the one eye than in an area enveloped by the first component.

6. The load introducing element, as claimed in claim 1, wherein the second component has a profile cross section that is substantially U shaped.

7. The load introducing element, as claimed in claim 1, further comprising at least one material layer which has a cross section that is L shaped, and which is applied simultaneously, at least in certain areas, on at least one element of the group consisting of the first component, the second component and the first flange.

8. The load introducing element, as claimed in claim 1, further comprising at least one wall plate, which is integrated into the at least one second component.

9. The load introducing element, as claimed in claim 1, further comprising at least one second flange, which is aligned substantially transversely to a direction of stretch of the load introducing element for attaching said load introducing element to load bearing structural components of the control surface.

10. The load introducing element, as claimed in claim 1, wherein the first component has means for connecting to a drive armature.

11. The load introducing element, as claimed in claim 1, wherein:
   the load introducing element is an integral component; and
   the first component, the second component, and at least the first flange comprise jointly impregnated and jointly cured pre-finished fibrous substructures.

12. A drive armature for driving a load introducing element, as claimed in claim 1, wherein the drive armature includes means for connecting to the load introducing element and means for connecting to an actuator.

13. The load introducing element according to claim 1, wherein when the control surface is viewed in cross-section, the control surface has an airfoil shape that includes an upper surface that is substantially non-linear and a lower surface that is substantially linear.

14. The load introducing element according to claim 13, wherein the at least one surface area of the first component has a shape that is complimentary to the upper surface of the control surface.

15. The load introducing element according to claim 14, wherein the cross sectional profile of the first component is substantially omega-shaped.

16. The load introducing element according to claim 15, wherein
a length of the at least one first flange is substantially equal to a length of the upper edge, and
the at least one first flange extends, from a side of the at least two substantially straight legs that is opposite to the upper side, in a direction that is substantially perpendicular to the at least two substantially straight legs.

17. An aircraft comprising:
a load introducing element for a control surface, the control surface having an upper surface that is non-linear and a lower surface that is substantially linear, both upper surface and lower surface being directly exposed to a fluid flow during aircraft operation, said load introducing element comprising
at least one first component;
at least one second component; and
at least one first flange for connecting to at least one rib of the control surface; wherein,
at least one surface area of the first component is adapted to an inner contour of the upper surface of the control surface;
the second component exhibits at least one eye for mounting the control surface; and
a cross sectional profile of the first component has at least two substantially straight legs, which are connected together on their upper side by means of an upper edge, that is adapted to the contour of the control surface.

18. The aircraft as claimed in claim 17, wherein the aircraft is a spacecraft.

19. An aircraft comprising:
at least one airfoil-shaped control surface with at least one load introducing element, the at least one load introducing element comprising
at least one first component;
at least one second component; and
at least one first flange for connecting to at least one rib of the airfoil-shaped control surface; wherein,
at least one surface area of the first component is adapted to a non-linear inner contour of the airfoil-shaped control surface;
the second component exhibits at least one eye for mounting the airfoil-shaped control surface; and
a cross sectional profile of the first component has at least two substantially straight legs, which are connected together on their upper side by means of an upper edge, that is adapted to the contour of the airfoil-shaped control surface.

* * * * *